(12) United States Patent
Lazaridis

(10) Patent No.: US 9,098,170 B2
(45) Date of Patent: Aug. 4, 2015

(54) SYSTEM, METHOD, AND USER INTERFACE FOR CONTROLLING THE DISPLAY OF IMAGES ON A MOBILE DEVICE

(75) Inventor: Mihal Lazaridis, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 761 days.

(21) Appl. No.: 11/675,970

(22) Filed: Feb. 16, 2007

(65) Prior Publication Data
US 2008/0102900 A1 May 1, 2008

Related U.S. Application Data

(60) Provisional application No. 60/863,674, filed on Oct. 31, 2006.

(51) Int. Cl.
*H04M 1/00* (2006.01)
*H04W 24/00* (2009.01)
*G06F 3/00* (2006.01)
*G06F 3/048* (2013.01)
*G09G 5/00* (2006.01)
(Continued)

(52) U.S. Cl.
CPC ............ *G06F 3/0482* (2013.01); *G06F 3/0481* (2013.01); *G06F 3/04845* (2013.01); *G06F 2203/04806* (2013.01); *G09G 2340/145* (2013.01)

(58) Field of Classification Search
CPC ............. H04M 1/72522; G06F 1/1626; G06F 17/30905; G06F 17/30265; G06F 3/0481; G06F 3/0482; G06F 3/14; G06F 3/1407; G06F 3/1431; G06F 17/3028; G06F 19/321; G06F 21/32; G06F 3/012; G96F 1/169; G96F 1/1632; G96F 1/1656; G06T 3/4092; H04L 12/5825; H04L 12/5835
USPC ........... 455/566, 456.3, 556.2, 403, 419, 466, 455/556.1; 715/772, 764, 730, 765, 786, 715/716, 825, 835; 345/2.3, 156, 632, 173, 345/581, 661, 594, 684; 370/389, 305; 348/E13.045, E13.059, E13.071, 53
See application file for complete search history.

(56) References Cited

U.S. PATENT DOCUMENTS 5,701,500 A  12/1997  Ikeo et al.
5,898,434 A * 4/1999  Small et al. .................... 715/810
(Continued)

FOREIGN PATENT DOCUMENTS

CA  2566557  4/2008
EP  1519155  3/2005
(Continued)

OTHER PUBLICATIONS

Notice of Allowance. Co-pending U.S. Appl. No. 11/395,107. Dated: Nov. 17, 2008.
Amendment. Co-pending U.S. Appl. No. 11/395,107. Dated: Sep. 26, 2008.
United States Office Action. Co-pending U.S. Appl. No. 11/395,107. Dated: Jun. 26, 2008.
(Continued)

*Primary Examiner* — Inder Mehra
(74) *Attorney, Agent, or Firm* — Perry + Currier Inc.

(57) ABSTRACT

Embodiments of a system, method, and user interface for controlling the display of images to users of mobile devices are disclosed. In one embodiment, a set of options to manipulate, navigate, and/or view images, common among multiple applications executable on a mobile device, is provided to users. Images may also be saved on a memory store on the mobile device.

16 Claims, 16 Drawing Sheets

(51) Int. Cl.
  *G06F 3/0482*  (2013.01)
  *G06F 3/0481*  (2013.01)
  *G06F 3/0484*  (2013.01)

(56) References Cited

U.S. PATENT DOCUMENTS

| | | | |
|---|---|---|---|
| 6,141,270 A | 10/2000 | Casper | |
| 6,281,872 B1 | 8/2001 | Cariffe | |
| 6,360,252 B1 | 3/2002 | Rudy et al. | |
| 6,396,006 B1* | 5/2002 | Yokoji et al. | 200/4 |
| 6,449,639 B1 | 9/2002 | Blumberg | |
| 6,556,217 B1 | 4/2003 | Makipaa et al. | |
| 6,915,333 B2 | 7/2005 | Delia et al. | |
| 7,038,701 B2 | 5/2006 | Niemi | |
| 7,072,984 B1 | 7/2006 | Polonsky et al. | |
| 7,091,998 B2* | 8/2006 | Miller-Smith | 345/810 |
| 7,209,149 B2 | 4/2007 | Jogo | |
| 7,216,092 B1* | 5/2007 | Weber et al. | 705/26.5 |
| 7,242,493 B2* | 7/2007 | Hall et al. | 358/1.15 |
| 7,511,723 B2* | 3/2009 | Sylthe et al. | 345/671 |
| 7,536,440 B2 | 5/2009 | Budd et al. | |
| 7,733,356 B2 | 6/2010 | Sylthe et al. | |
| 7,812,852 B2 | 10/2010 | Sylthe et al. | |
| 7,843,472 B2 | 11/2010 | Sylthe et al. | |
| 8,018,474 B2 | 9/2011 | Sylthe et al. | |
| 2001/0051007 A1 | 12/2001 | Teshima | |
| 2002/0016818 A1 | 2/2002 | Kirani et al. | |
| 2002/0062396 A1 | 5/2002 | Kakei et al. | |
| 2002/0075281 A1* | 6/2002 | Suzuki et al. | 345/619 |
| 2002/0126135 A1* | 9/2002 | Ball et al. | 345/600 |
| 2002/0137544 A1 | 9/2002 | Myojo | |
| 2002/0151283 A1* | 10/2002 | Pallakoff | 455/90 |
| 2002/0161796 A1 | 10/2002 | Sylthe | |
| 2003/0182323 A1* | 9/2003 | Demsky et al. | 707/203 |
| 2003/0210281 A1 | 11/2003 | Ellis et al. | |
| 2004/0003117 A1 | 1/2004 | McCoy et al. | |
| 2004/0073873 A1* | 4/2004 | Croney et al. | 715/526 |
| 2004/0100479 A1* | 5/2004 | Nakano et al. | 345/700 |
| 2004/0172453 A1 | 9/2004 | De Mendonca et al. | |
| 2004/0183817 A1 | 9/2004 | Kaasila | |
| 2004/0204144 A1* | 10/2004 | Lim | 455/566 |
| 2004/0229656 A1 | 11/2004 | Takahashi et al. | |
| 2004/0246523 A1 | 12/2004 | Moriwaki | |
| 2005/0012723 A1 | 1/2005 | Pallakoff | |
| 2005/0128366 A1 | 6/2005 | Cha | |
| 2005/0193074 A1 | 9/2005 | Garland | |
| 2005/0200610 A1 | 9/2005 | Skantze et al. | |
| 2005/0231648 A1 | 10/2005 | Kitamura et al. | |
| 2005/0232581 A1 | 10/2005 | Karasawa | |
| 2005/0234864 A1 | 10/2005 | Shapiro | |
| 2006/0031336 A1 | 2/2006 | Friedman et al. | |
| 2006/0033809 A1 | 2/2006 | Farley | |
| 2006/0055693 A1 | 3/2006 | Sylthe et al. | |
| 2006/0056334 A1 | 3/2006 | Yuan et al. | |
| 2006/0056604 A1 | 3/2006 | Sylthe et al. | |
| 2006/0061550 A1 | 3/2006 | Fateh | |
| 2006/0062362 A1 | 3/2006 | Davis | |
| 2006/0128407 A1* | 6/2006 | Kim | 455/466 |
| 2006/0156240 A1 | 7/2006 | Lemay et al. | |
| 2006/0174297 A1* | 8/2006 | Anderson et al. | 725/100 |
| 2006/0225001 A1 | 10/2006 | Sylthe et al. | |
| 2006/0268100 A1* | 11/2006 | Karukka et al. | 348/14.01 |
| 2007/0011258 A1 | 1/2007 | Khoo | |
| 2007/0283247 A1 | 12/2007 | Brenneman et al. | |
| 2008/0028335 A1 | 1/2008 | Rohrabaugh et al. | |
| 2008/0102887 A1 | 5/2008 | Sylthe et al. | |
| 2008/0188304 A1 | 8/2008 | Escalera et al. | |
| 2008/0214204 A1 | 9/2008 | Ramer et al. | |
| 2008/0307455 A1 | 12/2008 | Praest | |
| 2008/0309795 A1 | 12/2008 | Mitsuhashi et al. | |
| 2008/0316225 A1 | 12/2008 | Sylthe et al. | |

FOREIGN PATENT DOCUMENTS

| | | | |
|---|---|---|---|
| WO | WO 02/39712 | 5/2002 | |
| WO | WO 2004/034194 | 4/2004 | |
| WO | WO 2004034194 A2 * | 4/2004 | |
| WO | WO 2005/027473 | 3/2005 | |
| WO | WO 2005027473 A1 * | 3/2005 | H04M 1/00 |
| WO | 2008/052301 | 5/2008 | |

OTHER PUBLICATIONS

Co-pending U.S. Appl. No. 11/395,107, "Method for Requesting and Viewing an Attachment Image on a Portable Electronic Device", filed Mar. 31, 2006.
Written Opinion. Application No. PCT/CA2007/000243 dated Jul. 16, 2007.
Co-pending U.S. Appl. No. 12/371,136, "Method for Requesting and Viewing an Attachment Image on a Portable Electronic Device", filed Feb. 13, 2009.
Office Action. Co-pending U.S. Appl. No. 12/371,136. Dated: Aug. 21, 2009.
Amendment. Co-pending U.S. Appl. No. 12/371,136. Dated: Nov. 18, 2009.
Notice of Allowance. Co-pending U.S. Appl. No. 12/371,136. Dated: Jan. 27, 2010.
Co-pending U.S. Appl. No. 12/767,352, "Method for Requesting and Viewing an Attachment Image on a Portable Electronic Device", filed Apr. 26, 2010.
Notice of Allowance. Co-pending U.S. Appl. No. 12/767,352. Dated: Jul. 23, 2010.
Canadian First Office Action. Application No. 2,566,557. Dated: Jun. 1, 2010.
Co-pending U.S. Appl. No. 12/911,230, "Method for Requesting and Viewing an Attachment Image on a Portable Electronic Device", filed Oct. 25, 2010.
Extended European Search Report. European Patent Application No. 07719380.3. Dated: May 9, 2011.
Communication Pursuant to Rules 70(2) and 70a(2) EPC. European Patent Application No. 07719380.3. Dated: May 26, 2011.
Office Action. Canadian Application No. 2,566,557. Dated: Aug. 16, 2011.
Notice of Allowance. Co-pending U.S. Appl. No. 12/911,230. Dated: May 17, 2011.
Office Action. Co-pending U.S. Appl. No. 12/911,230. Dated: Feb. 2, 2011.
Response with Terminal Disclaimers. Co-pending U.S. Appl. No. 12/911,230. Dated: Mar. 23, 2011.
Response. European Patent Application No. 07719380.3. Dated: Jul. 18, 2011.
Exam Report. European Patent Application No. 07719380.3. Dated: Oct. 15, 2012.
Office Action. Canadian Patent Application No. 2,566,557. Dated: Aug. 22, 2012.
Response. European Patent Application No. 07719380.3. Dated: Feb. 11, 2013.
International Search Report. Application No. PCT/CA2007/000243. Dated: Jul. 16, 2007.
International Preliminary Report on Patentability. Application No. PCT/CA2007/000243. Dated: May 5, 2009.
Office Action. Canadian Patent Application No. 2,566,557. Dated: Oct. 30, 2013.
Summons to attend oral proceedings pursuant to Rule 115(1) EPC. European Patent Application No. 07719380.3. Dated: Jul. 4, 2014.
Request to Withdraw. European Patent Application No. 07719380.3. Dated: Jul. 24, 2014.
Acknowledgement of Withdrawal. European Patent Application No. 07719380.3. Dated: Jul. 30, 2014.
Office Action. Canadian Patent Application No. 2,566,557. Dated: Sep. 8, 2014.

* cited by examiner

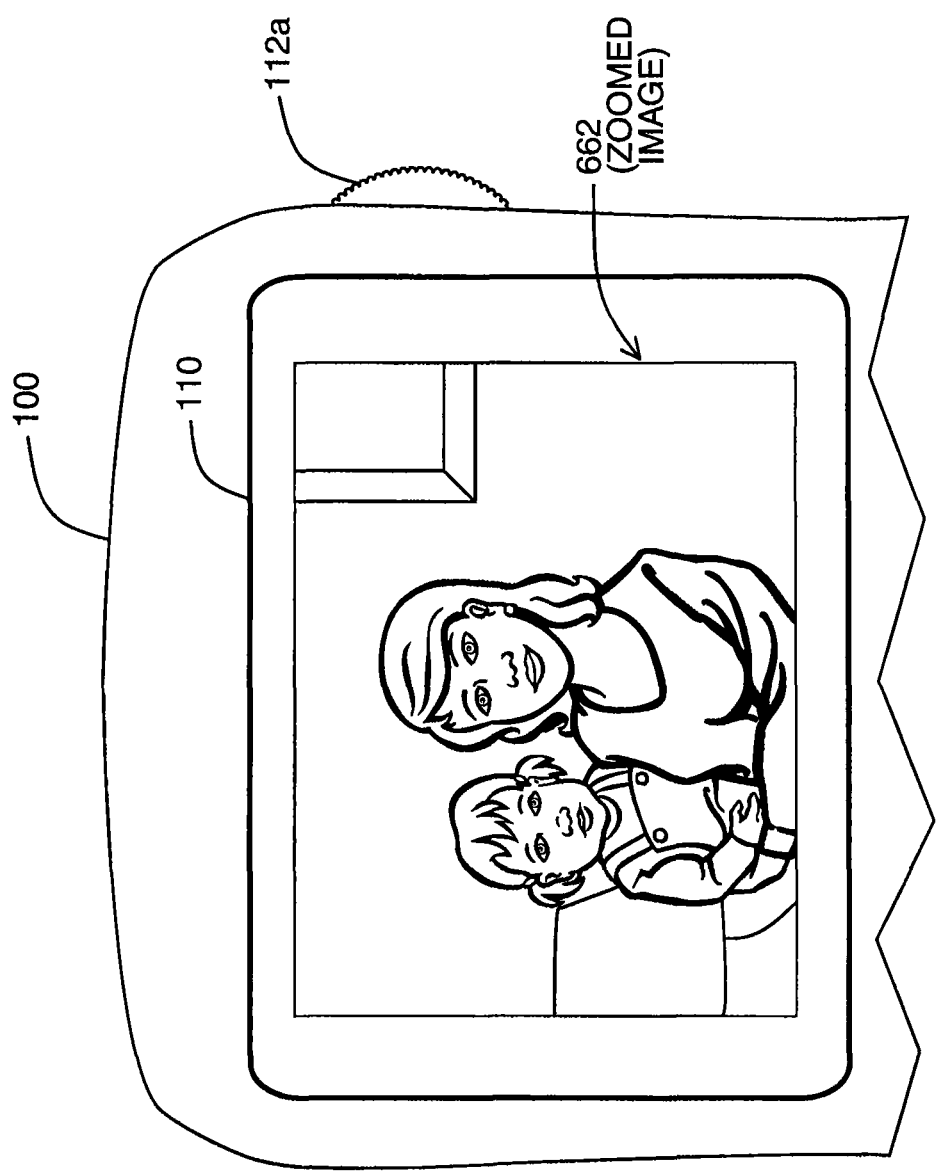

ized by, for example, the user ... (skipping)

SYSTEM, METHOD, AND USER INTERFACE FOR CONTROLLING THE DISPLAY OF IMAGES ON A MOBILE DEVICE

CROSS-REFERENCE TO RELATED APPLICATIONS

This application claims the benefit of U.S. Provisional Application No. 60/863,674, filed Oct. 31, 2006, the contents of which are hereby incorporated by reference.

RELEVANT FIELD

Embodiments described herein relate generally to mobile device applications, and more specifically to a system, method, and user interface for controlling the display of images to users of mobile devices.

BACKGROUND

Applications for mobile devices are typically provided as scaled-down versions of applications designed for desktop computing devices. However, the limited resolution and small display screens of mobile devices can affect, for example, the relative ease with which certain tasks are performed by users, the amount of information that may be displayed on a screen, and the manner in which that information is displayed.

For example, some applications designed for execution on a mobile device allow users to view images displayed on the mobile device screen. For instance, an image of a webpage, which itself may comprise embedded images, may be displayed to a user in the execution of a browser application. As a further example, users may view pictures stored in an image or graphics format in the execution of a picture viewer application or the like on the mobile device.

BRIEF DESCRIPTION OF THE DRAWINGS

For a better understanding of embodiments of the systems, methods, and user interfaces described herein, and to show more clearly how they may be carried into effect, reference will be made, by way of example, to the accompanying drawings in which:

FIGS. 7A to 7D illustrate examples of screenshots of a user interface provided by a picture viewer application executing on a mobile device in at least one embodiment.

DETAILED DESCRIPTION

Figure 1:
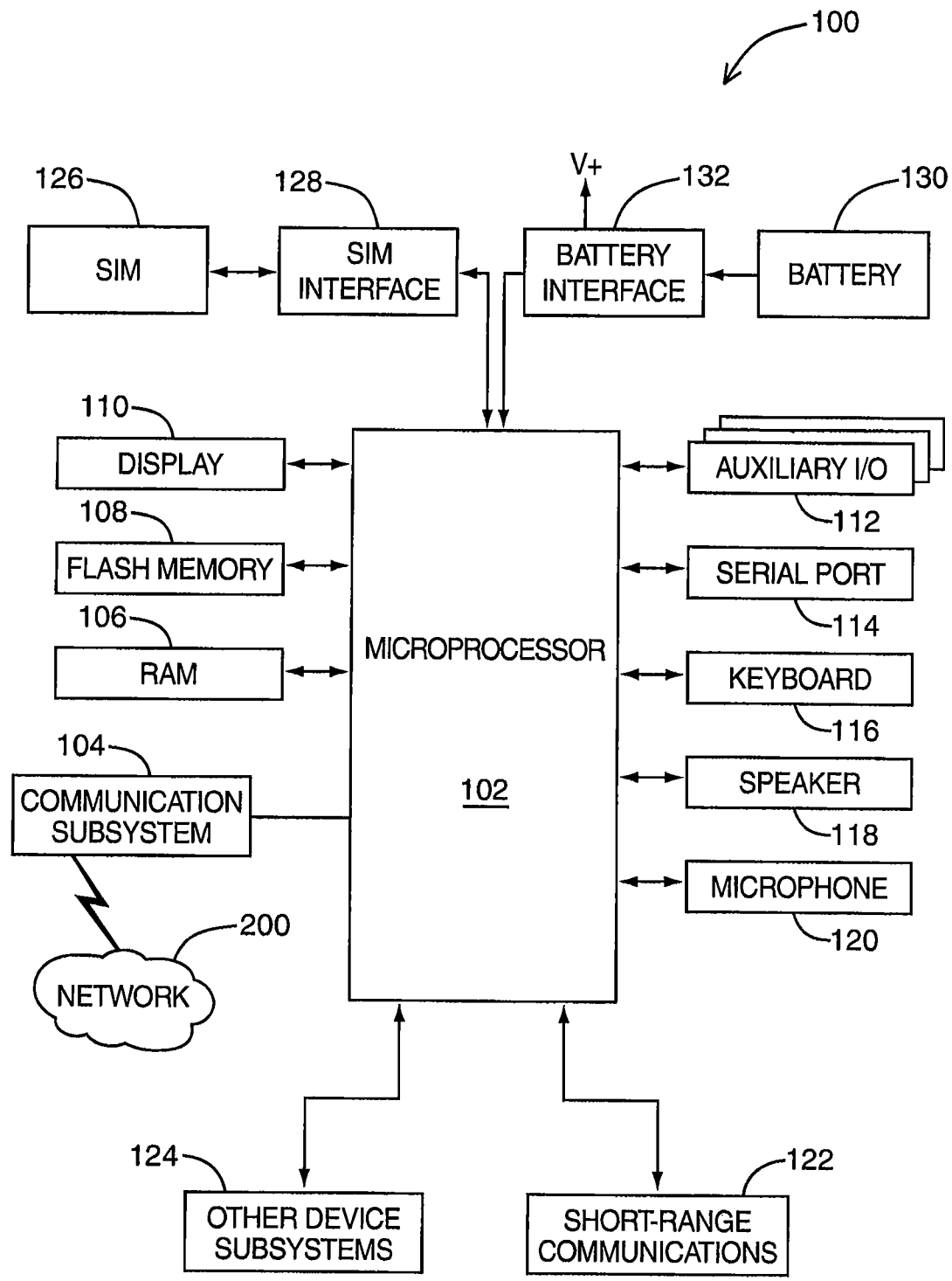
FIG. 1 is a block diagram of a mobile device in one example implementation.

Known software applications designed for execution on mobile devices that are programmed such that images are displayed to users during their execution (e.g. attachment viewer, browser, picture viewer, etc.) may or may not provide options that allow users to change the view of an image.

The view of an image might be changed if, for example, the user proceeds to manipulate or navigate a displayed image or if the view of the image is otherwise modified in some way (e.g. by rotating the image, zooming in, zooming out).

Furthermore, even where some such options may be provided, these options may differ across different applications to be executed on the same mobile device.

At least some embodiments of the systems, methods, and user interfaces described herein relate generally to mobile device applications programmed to display or otherwise manage images during their execution, and more specifically to mobile device applications that provide users with improved image manipulation, navigation, and/or viewing capabilities.

For example, in one embodiment, at least one option relating to image manipulation, navigation, and/or viewing is provided to users, where the same options are common to multiple applications that offer image display capabilities and that are executable on the mobile device.

It will be understood by persons skilled in the art that an image may exist in any of a number of known image or graphic formats. For example, some common image or graphic formats include the bit-mapped graphics format (BMP), the joint photographic experts group (JPEG, JPG) format, the tagged image file format (TIFF), the graphics interchange format (GIF), the portable network graphics (PNG), and the PCX format.

In addition to images in these and other image or graphic formats, for the purposes of the specification and in the claims, an image may also comprise a (e.g. temporary) rendering of data on a mobile device display. For example, data being displayed that originates from other applications (e.g. word processor, spreadsheet, slide presentation, files in portable document format (PDF), etc.), as displayed on a mobile device screen, may be considered to be an image. Accordingly, depending on the application, this image may also be subject to changes, for example, through manipulation or navigation by the user or by otherwise modifying the view of the image.

In one broad aspect, there is provided a system for controlling the display of images on a mobile device, wherein the system comprises: a processor, a memory, and a display screen; wherein a plurality of applications are executable by the processor, wherein each of the plurality of applications is programmed such that, in operation, a first view of an image is displayed to a user of the mobile device, a plurality of options to change the first view of the image is provided to the user, input that comprises an option identified by the user from the plurality of options to change the first view of the image is received from the user, the first view of the image is changed to produce a second view of the image, and the second view of the image is displayed to the user; and wherein when any of the plurality of applications is executed, the plurality of options to change the first view of the image is provided to the user.

In another broad aspect, there is provided a method of controlling the display of images on a mobile device, the method comprising the steps of: a) displaying a first view of an image to a user of the mobile device; b) providing the user with a plurality of options to change the first view of the image; c) receiving input that comprises an option identified by the user from the plurality of options to change the first view of the image from the user; d) changing the first view of the image to produce a second view of the image; and e) displaying the second view of the image to the user; wherein each of a plurality of applications is executable on the mobile device and programmed such that, in operation, steps a) to e) are performed; and wherein when any of the plurality of applications executes so that step b) is performed, the plurality of options to change the first view of the image is provided to the user.

Features of these and other aspects, and of a number of embodiments of systems, methods, and user interfaces are described below.

The description of embodiments of the systems, methods, and user interfaces described herein make reference to a mobile device, also known in the art as a mobile station. A mobile device is a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 2:
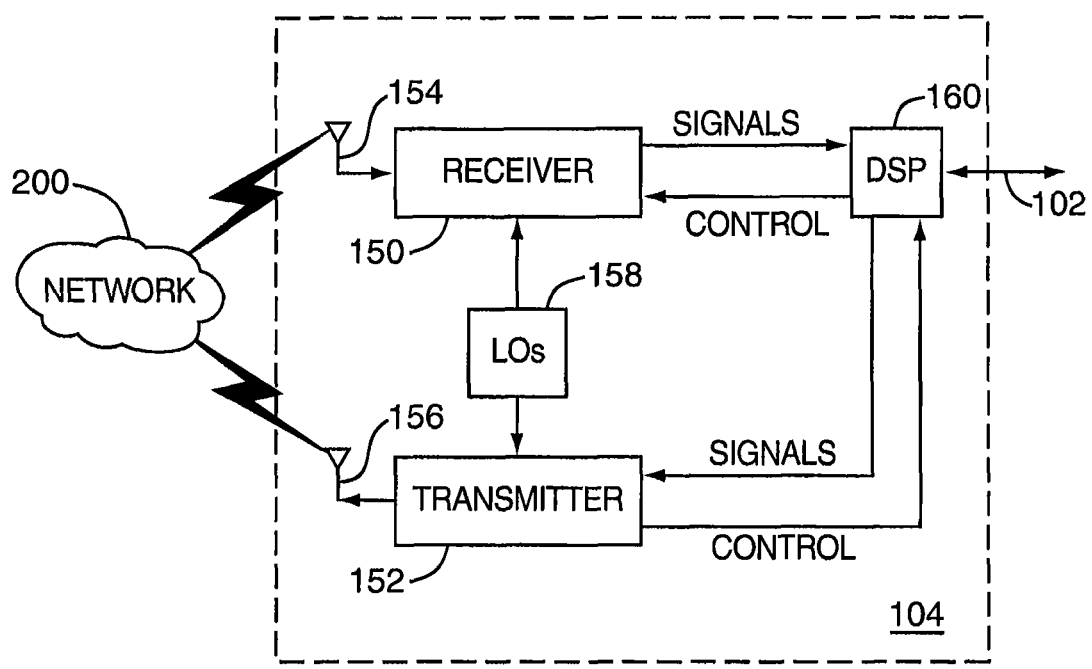
FIG. 2 is a block diagram of a communication subsystem component of the mobile device of FIG. 1.
Figure 3:
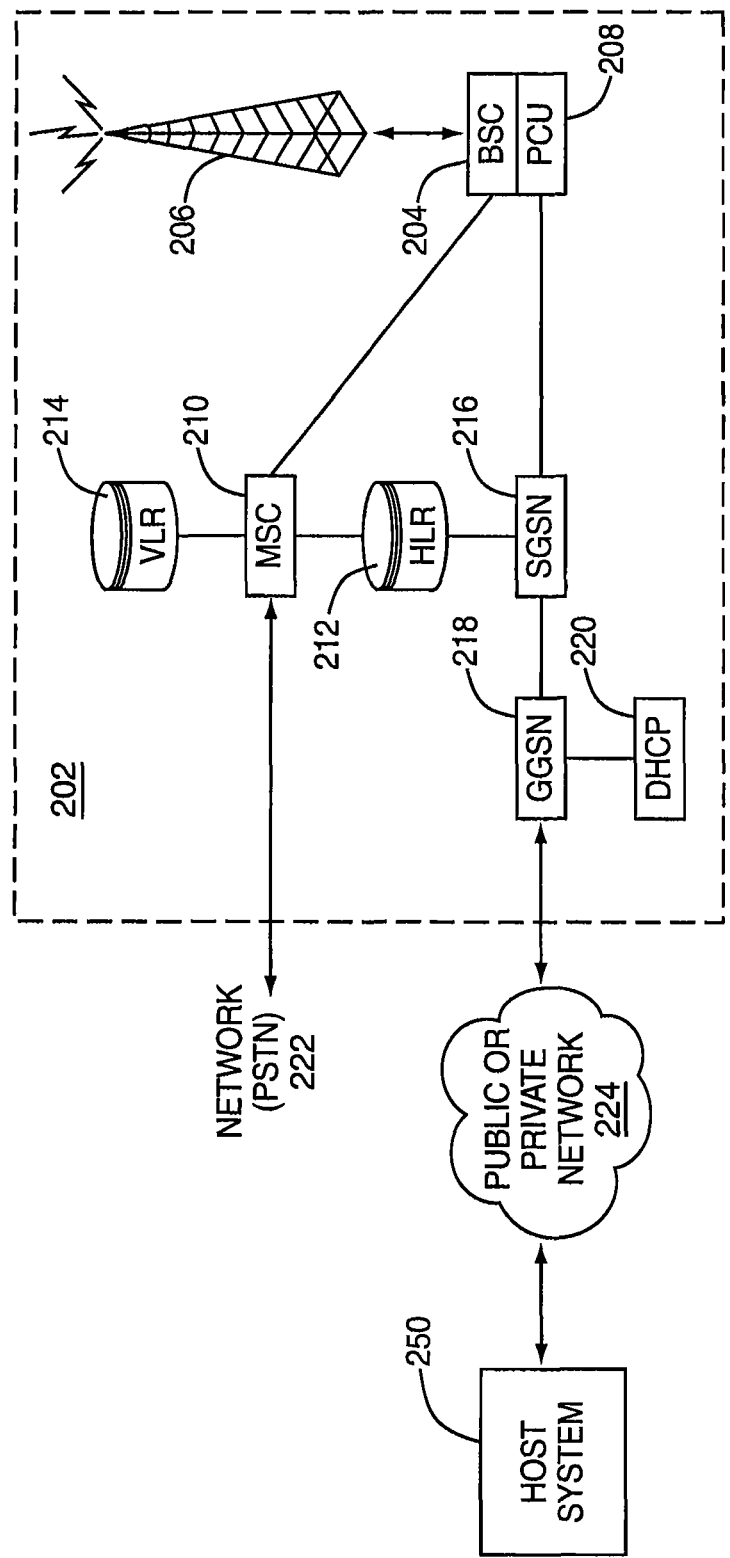
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Other network communication technologies that may be employed include, for example, Integrated Digital Enhanced Network (iDEN™), Evolution-Data Optimized (EV-DO), and High Speed Downlink Packet Access (HSDPA).

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound to any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, short-range communication subsystem 122 may include an infrared device and associated circuits and components for short-range communication. The short-range communication subsystem 122 can be used to communicate with a Wireless Personal Area network (WPAN). In some cases, the short-range communications subsystem 122 can comprise a Bluetooth radio, a ZigBee device, a Wireless USB (WUSB) device, and/or an Ultra-Wideband (UWB) radio, for example. Examples of short range communication standards include standards developed by the Infrared Data Association (IrDA), Bluetooth, ZigBee, WUSB, UWB, and the 802.11 and 802.15 families of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time require less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

At least some embodiments described herein relate generally to improved control features for manipulating, navigating, and/or viewing images displayed to a user on a mobile device.

In one embodiment, an attachment viewer application is programmed to provide the user with the ability to magnify (e.g. "zoom in") an image currently being displayed by the attachment viewer application in a mobile device display screen.

In one embodiment, an attachment viewer application is programmed to provide the user with the ability to reduce (e.g. "zoom out") an image currently being displayed by the attachment viewer application in a mobile device display screen.

In one embodiment, an attachment viewer application is programmed to provide the user with the ability to display an image in a view where the image currently being displayed by the attachment viewer application in a mobile device display screen is neither magnified nor reduced (e.g. "zoom 1:1").

In one embodiment, an attachment viewer application is programmed to provide the user with the ability to display an image in a view where the entirety of an image (e.g. "zoom all") is to be displayed by the attachment viewer application in a mobile device display screen.

In one embodiment, an attachment viewer application is programmed to provide the user with the ability to display an image in a view where the image currently being displayed by the attachment viewer application in a mobile device display screen is rotated.

In one embodiment, an attachment viewer application is programmed to allow users to save the image currently being viewed on the mobile device screen as a picture. The picture may be saved in any of a number of image or graphic formats (e.g. BMP, JPEG, JPG, TIFF, GIF, PNG, PCX). The attachment viewer application may be configured to allow the user to specify the specific format in which the image is to be saved. The attachment viewer application may be configured to select a default image format for saved images. The saved image may be the entire image, even if only a portion of the image is provided to the user for viewing within the mobile device display screen. In variant embodiments, only the portion of image that is viewed within the mobile device display screen is saved. In one such embodiment, the saved image may reflect any changes that have been applied to the image as viewed by the user.

In one embodiment, an attachment viewer application is programmed to set the image for use as a background image (e.g. for a home screen or a standby screen). The set image may be the entire image, even if only a portion of the image is provided to the user for viewing within the mobile device display screen. In variant embodiments, only the portion of image that is viewed within the mobile device display screen is set. In one such embodiment, the set image may reflect any changes that have been applied to the image as viewed by the user.

In one embodiment, an attachment viewer application is programmed to copy the image for use by a different application. The copied image may be the entire image, even if only a portion of the image is provided to the user for viewing within the mobile device display screen. In variant embodiments, only the portion of image that is viewed within the mobile device display screen is copied. In one such embodiment, the copied image may reflect any changes that have been applied to the image as viewed by the user.

In one embodiment, a browser application is programmed to provide the user with the ability to magnify (e.g. "zoom in") an image currently being displayed by the browser application in a mobile device display screen.

In one embodiment, a browser application is programmed to provide the user with the ability to reduce (e.g. "zoom out") an image currently being displayed by the browser application in a mobile device display screen.

In one embodiment, a browser application is programmed to provide the user with the ability to display an image in a view where the image currently being displayed by the browser application in a mobile device display screen is neither magnified nor reduced (e.g. "zoom 1:1").

In one embodiment, a browser application is programmed to provide the user with the ability to display an image in a view where the entirety of an image (e.g. "zoom all") is to be displayed by the browser application in a mobile device display screen.

In one embodiment, a browser application is programmed to provide the user with the ability to display an image in a view where the image currently being displayed by the browser application in a mobile device display screen is rotated.

In one embodiment, a browser application is programmed to allow users to save the image currently being viewed on the mobile device screen as a picture. The picture may be saved in any of a number of image or graphic formats (e.g. BMP, JPEG, JPG, TIFF, GIF, PNG, PCX). The browser application may be configured to allow the user to specify the specific format in which the image is to be saved. The browser application may be configured to select a default image format for saved images. The saved image may be the entire image, even if only a portion of the image is provided to the user for viewing within the mobile device display screen. In variant embodiments, only the portion of image that is viewed within the mobile device display screen is saved. In one such embodiment, the saved image may reflect any changes that have been applied to the image as viewed by the user.

In one embodiment, a browser application is programmed to set the image for use as a background image (e.g. for a home screen or a standby screen). The set image may be the entire image, even if only a portion of the image is provided to the user for viewing within the mobile device display screen. In variant embodiments, only the portion of image that is viewed within the mobile device display screen is set. In one such embodiment, the set image may reflect any changes that have been applied to the image as viewed by the user.

In one embodiment, a browser application is programmed to copy the image for use by a different application. The copied image may be the entire image, even if only a portion of the image is provided to the user for viewing within the mobile device display screen. In variant embodiments, only the portion of image that is viewed within the mobile device display screen is copied. In one such embodiment, the copied image may reflect any changes that have been applied to the image as viewed by the user.

In one embodiment, a picture viewer application is programmed to provide the user with the ability to magnify (e.g. "zoom in") an image currently being displayed by the picture viewer application in a mobile device display screen.

In one embodiment, a picture viewer application is programmed to provide the user with the ability to reduce (e.g. "zoom out") an image currently being displayed by the picture viewer application in a mobile device display screen.

In one embodiment, a picture viewer application is programmed to provide the user with the ability to display an image in a view where the image currently being displayed by the picture viewer application in a mobile device display screen is neither magnified nor reduced (e.g. "zoom 1:1").

In one embodiment, a picture viewer application is programmed to provide the user with the ability to display an image in a view where the entirety of an image (e.g. "zoom all") is to be displayed by the picture viewer application in a mobile device display screen.

In one embodiment, a picture viewer application is programmed to provide the user with the ability to display an image in a view where the image currently being displayed by the picture viewer application in a mobile device display screen is rotated.

In one embodiment, a picture viewer application is programmed to allow users to save the image currently being viewed on the mobile device screen as a picture. The picture may be saved in any of a number of image or graphic formats (e.g. BMP, JPEG, JPG, TIFF, GIF, PNG, PCX). The picture viewer application may be configured to allow the user to specify the specific format in which the image is to be saved. The picture viewer application may be configured to select a default image format for saved images. The saved image may be the entire image, even if only a portion of the image is provided to the user for viewing within the mobile device display screen. In variant embodiments, only the portion of image that is viewed within the mobile device display screen is saved. In one such embodiment, the saved image may reflect any changes that have been applied to the image as viewed by the user.

In one embodiment, a picture viewer application is programmed to set the image for use as a background image (e.g. for a home screen or a standby screen). The set image may be the entire image, even if only a portion of the image is provided to the user for viewing within the mobile device display screen. In variant embodiments, only the portion of image that is viewed within the mobile device display screen is set. In one such embodiment, the set image may reflect any changes that have been applied to the image as viewed by the user.

In one embodiment, a picture viewer application is programmed to copy the image for use by a different application.

The copied image may be the entire image, even if only a portion of the image is provided to the user for viewing within the mobile device display screen. In variant embodiments, only the portion of image that is viewed within the mobile device display screen is copied. In one such embodiment, the copied image may reflect any changes that have been applied to the image as viewed by the user.

In at least one embodiment, a common set of multiple image management options, which may include manipulation, navigation, and/or viewing options, will be provided to users in multiple applications. For example, zoom in, zoom out, zoom 1:1, and rotate functions may be provided as common image management options to multiple applications. As a further example, a set of common image management options may be provided to an attachment viewer application, a browser application, and a picture application.

By providing common image management options across multiple applications, it will be less likely that mobile device users will be required to familiarize themselves with and learn numerous different image management functions and their associated commands. This may provide a more intuitive and improved user interface for mobile device users.

It will be understood by persons skilled in the art that the group of applications comprising an attachment viewer application, a browser application and a picture viewer application, has been referred to herein by way of example only. Different and/or additional applications programmed to display images to users or that otherwise allow users to manage images may also be programmed to provide one or more of the features described herein in variant implementations.

Figure 4:
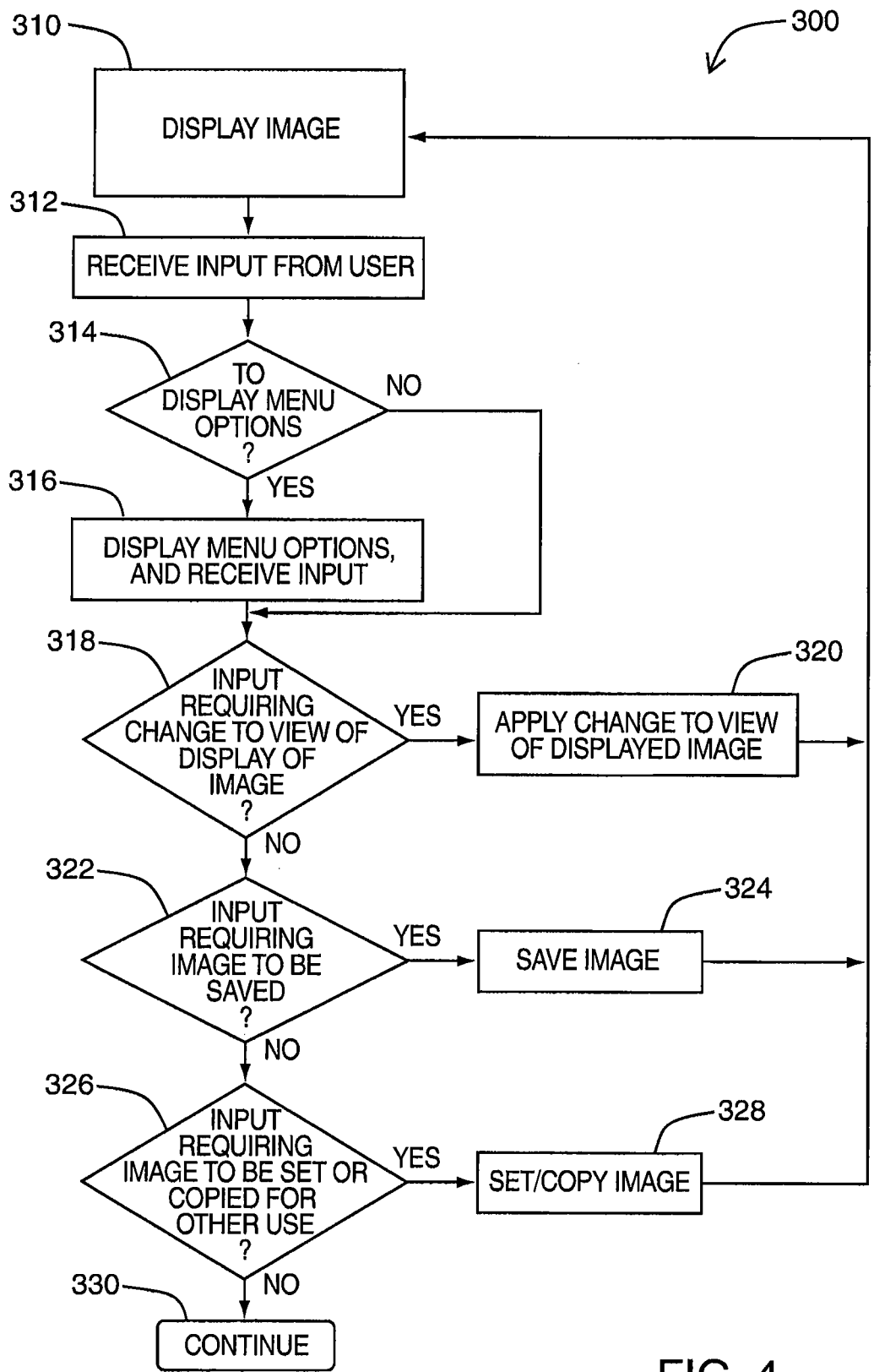
FIG. 4 is a flowchart illustrating steps of a method of controlling the display of images on a mobile device in at least one embodiment.

Referring now to FIG. 4, a flowchart illustrating steps of a method of controlling the display of images on a mobile device in at least one embodiment is shown generally as 300.

Some of the features described with reference to FIG. 4 have been described earlier in this description, and the reader is directed to the relevant paragraphs therein for additional details in respect of method 300.

In this example, unless otherwise specified, the steps of method 300 are performed by at least one application executing on a mobile device (e.g. mobile device 100 of FIG. 1). For example, the steps of method 300 may be performed by an attachment viewer application, a browser application, a picture viewer application, and/or any other application programmed to display images to a user or that otherwise allows users to manage images.

At step 310, an image is displayed in a display screen (e.g. display 110 of FIG. 1) of the mobile device in a first view.

A title bar may optionally be provided and displayed in the display screen with the image. The title bar, where provided, may be populated with information on the image being displayed. Such information may include, for example: a name of a file associated with the displayed image, an icon identifying the file as an image file, an indicator of the file type, the size of the file, an indication of the size of the file that has been downloaded to the mobile device, a name or icon identifying the application currently being used to view the image, an indication of whether or not the image currently being displayed has been magnified or reduced relative to the original image size, an indication of a factor by which the image has been magnified or reduced relative to the original image size, an indication of whether the image has been rotated relative to the original image orientation, and/or an indication of a factor by which the image has been rotated relative to the original image orientation.

Given the relatively small size of the display screens typically associated with mobile devices, the image may be displayed in a view that occupies the entire display screen. However, in variant embodiments, the image may be displayed in an area that partially occupies the display screen.

At step 312, input is received from the user in response to the display of the image performed at step 310. For example, the user may initiate an operation using an input device such as a track wheel for example, to request the display of a menu of options. Alternatively, the user may provide input using an input device such as a keyboard with pre-programmed keys for example, such that when certain keys are pressed, an operation (e.g. panning the image in a particular direction) associated with those keys is performed without requiring a menu to be displayed.

At step 314, it is determined whether the input received from the user at step 312 is associated with a request for a menu of options to be displayed. If so, a menu of options is displayed and further input is received from the user at step 316; otherwise, the flow of method steps proceeds directly to step 318.

At step 318, it is determined whether the input received from the user (i.e. a menu selection received at step 316, or other input not the result of a menu selection) is associated with an operation that requires a change to the view of the image being displayed.

For example, the input may direct the application to display the image in a magnified state (e.g. "zoom in"). A general "zoom in" option may have been provided to the user at step 316, where the user does not specify a magnification factor (e.g. a default magnification factor will be applied to the image). Alternatively, or in addition to the general option, the user may be provided with a zoom option that allows the user to specify a magnification factor.

As a further example, the input may direct the application to display the image in a reduced state (e.g. "zoom out"). A general "zoom out" option may have been provided to the user at step 316, where the user does not specify a reduction factor (e.g. a default reduction factor will be applied to the image). Alternatively, or in addition to the general option, the user may be provided with a zoom option that allows the user to specify a reduction factor.

As a further example, the input may direct the application to display the image in a rotated state (e.g. "rotate"). A general "rotate" option may have been provided to the user at step 316, where the user does not specify a degree of rotation (e.g. a default degree of rotation will be applied to the image). Alternatively, or in addition to the general option, the user may be provided with a rotation option that allows the user to specify a degree of rotation.

As a further example, the input may also require the application to show the image in a scale where the image is neither magnified nor reduced ("zoom 1:1"). It will be understood that when this option is selected and applied, this may not result in the entire of an image being displayed on the screen, depending on the size of the original image.

Other options (e.g. "zoom all") may be provided to allow users to request that an entire image be displayed on the display screen of the mobile device.

If it is determined at step 318 that the input received from the user is associated with an operation that requires a change to the view of the image being displayed, then at step 320, the operation is performed and the change(s) associated with the operation is applied to the first view of the displayed image accordingly, to produce a second view of the image incorporating the change(s).

Alternatively, at step 322, if the input is determined to represent a request by the user to save the image being displayed, then at step 324 the image is saved to a memory store on the mobile device. For example, the image may be stored in a designated picture store on the mobile device (e.g. in flash memory 108 of FIG. 1). The application may be configured to save the image in a default format, or in a format specified by the user. As previously noted in this description, the image may be saved in its original form, or only the portion that is viewed by the user in the display screen may be saved. The image may also be saved to reflect any changes to the view of the image that have been made (e.g. as applied at step 320 in previous iterations of method 300).

Alternatively, at step 326, if the input is determined to represent a request by the user to set the image as a background image (e.g. for a home screen image or for a standby screen), or to copy the image for use outside of the present application that the image is being displayed in, then the respective set or copy operation is performed at step 328. As previously noted in this description, the image may be set or copied in its original form, or only the portion that is viewed by the user in the display screen may be set or copied. The image that is set or copied may also reflect any changes to the view of the image that have been made (e.g. as applied at step 320 in previous iterations of method 300).

Otherwise, the flow of method steps proceeds to step 330, where the input received by the user at step 312 or 316 may be further processed by the application in known manner.

In one embodiment, once a change has been applied to the view of an image or after the image has been saved, set or copied, other operations may be performed, as may be directed by further input received from the user. Accordingly, the flow of method steps from steps 320, 324 and 328 proceeds back to step 310, where the image is displayed, potentially in a changed view, to the user.

Referring now to FIGS. 5A to 5D, examples of screenshots of a user interface provided by an attachment viewer application executing on a mobile device in at least one embodiment are shown.

Figure 5A:
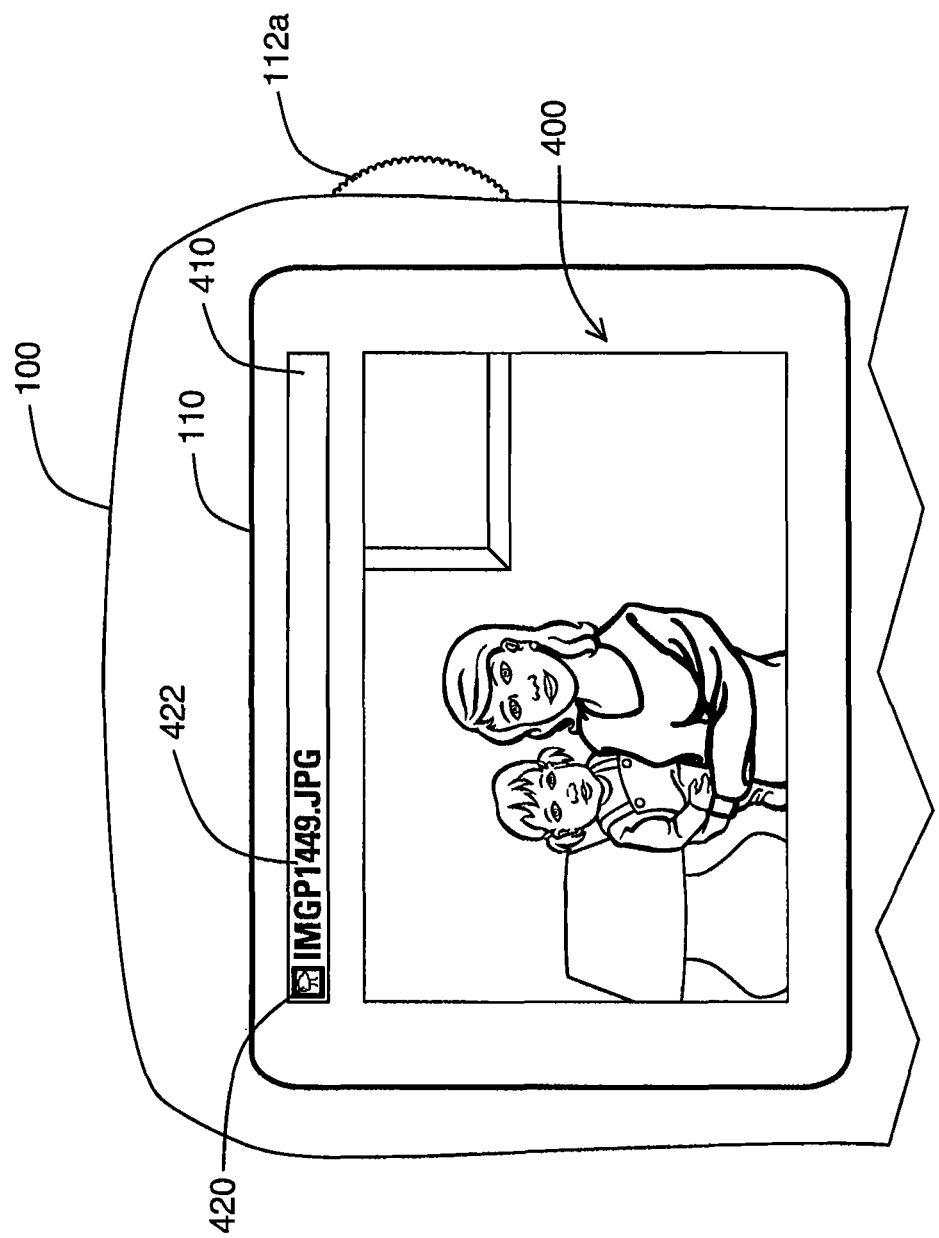
FIGS. 5A to 5D illustrate examples of screenshots of a user interface provided by an attachment viewer application executing on a mobile device in at least one embodiment.

In FIG. 5A, an image 400 displayed in a first view by the attachment viewer application in a display 110 of mobile device 100, is shown. In this example, a title bar 410 is also provided, which is populated to provide information associated with image 400. In this example, title bar 410 appears as a header above the image 400 in display 110, although title bar 410 may be displayed differently in variant embodiments. The information may also be provided in a different form other than within a title bar 410, in variant embodiments.

In this example, an icon 420 is displayed in title bar 410 indicating that the attachment is an image.

In this example, a filename 422 is displayed in title bar 410, indicating the file from which image 400 is extracted. Although not shown in this example, other details associated with image 400 may also be provided to the user in variant embodiments.

In this example, the user uses a track wheel 112a on mobile device 100 to request that a menu of options be displayed (by pressing track wheel 112a).

Figure 5B:
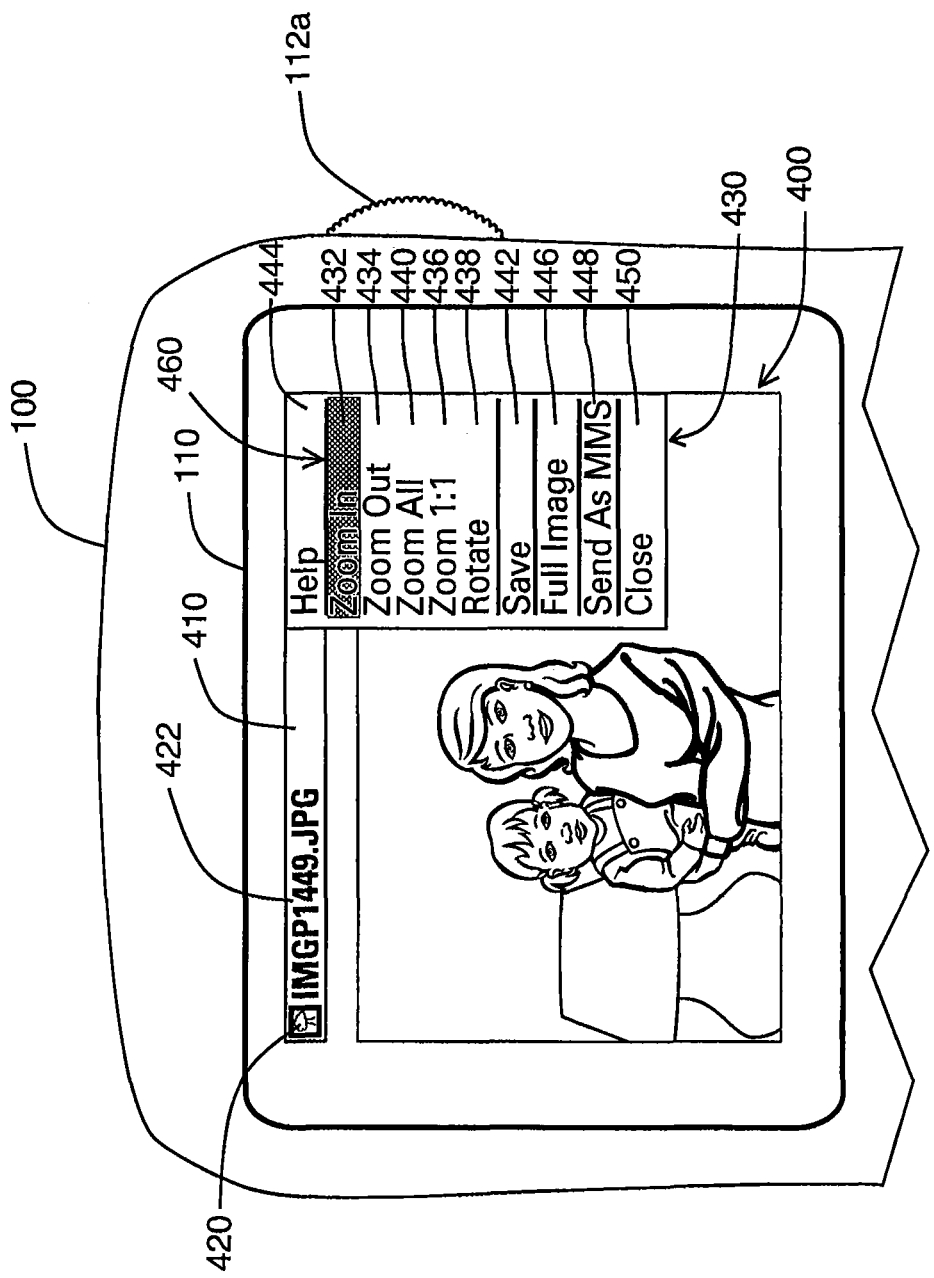

Referring to FIG. 5B, a menu of options 430 is displayed in display 110 of mobile device 100. Options in menu 430 or groups thereof may be separated by one or more line separators displayed in menu 430.

In one embodiment, the following options may be provided to a user to request operations, which when applied, may change the view of image 400 being displayed to the user:
  zoom in option (432)—magnify image by a default magnification factor;
  zoom out option (434)—reduce image by a default reduction factor;
  zoom 1:1 option (436)—display image at a scale where image is neither magnified nor reduced;
  rotate option (438)—rotate image by a default rotation factor;
  zoom all option (440)—magnify or reduce image as necessary to allow the entirety of the image to be displayed in display 110.

The foregoing options are provided by way of example only. A subset of these options, additional options, and/or different options may be provided in variant embodiments.

The options provided to a user to request operations, which when applied, may change the view of image 400 being displayed to the user, may be shown grouped together in the displayed menu of options 430 to facilitate ease of identification by the user. In one embodiment, the order in which these options are displayed may be consistent across multiple applications executable on mobile device 100.

In this example, a save option 442 is also provided to the user, allowing the user to save the image (e.g. the original image without modification) as a picture in a local picture store [not explicitly shown] on mobile device 100.

Other options in menu 430 may also be provided to the user. By way of example only, these other options may include:
  help option (444)—request help;
  full image option (446)—request attachment server to return the original image in its unmodified, full-size form (described more fully below);
  send option (448)—send the image as a (e.g. Multimedia Message Service (MMS)) message;
  close option 450—close the menu of options and return to viewing image.

In an example embodiment, the image 400 that appears on display 110 is a version transformed by an attachment server or other component of host system 250 for display by mobile device 100. Such transformations may, for example, involve resizing the image to a size suitable for rendering on display 110. In this case, full image option 446 causes the mobile device 100 to request the full and unmodified image from the host system 250.

Where all available options cannot be displayed in the portion of menu 430 being displayed in display 110, the user may scroll through menu 430 to cause other options to be displayed, using track wheel 112a. An arrow or other indicator (not shown) indicating that additional options are available but not currently shown may be displayed within menu 430.

In the example of FIG. 5B, a highlight bar 460 is shown in display 110 within menu 430. By rotating track wheel 112a, highlight bar 460 may be repositioned to highlight different menu options in menu 430. Once the user identifies a specific menu option, by manipulating track wheel 112a so that highlight bar 460 settles on that specific option, the user may, for example, click track wheel 112a to select the highlighted option. In this example, highlight bar 460 is shown as highlighting zoom in option 432.

Figure 5C:
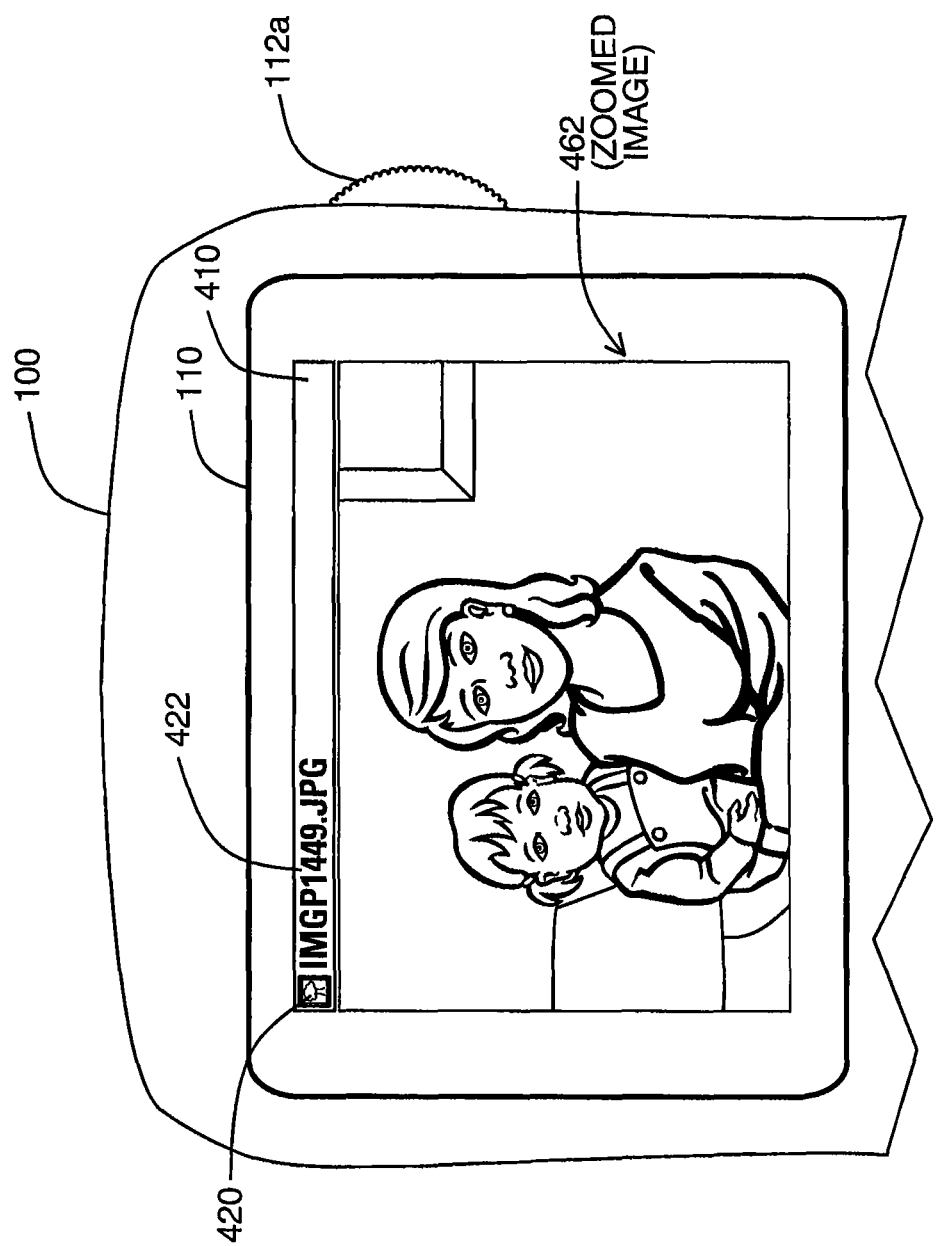

Referring to FIG. 5C, in this example, the user has selected zoom in option 432 of FIG. 5B by clicking track wheel 112a. The operation associated with the selected option is applied, causing image 400 to be magnified. The resultant magnified ("zoomed in") image in a new view 462 is shown in display 110. As is shown in FIG. 5C, once the zoom operation has been performed, menu 430 is no longer displayed in display 110.

Figure 5D:
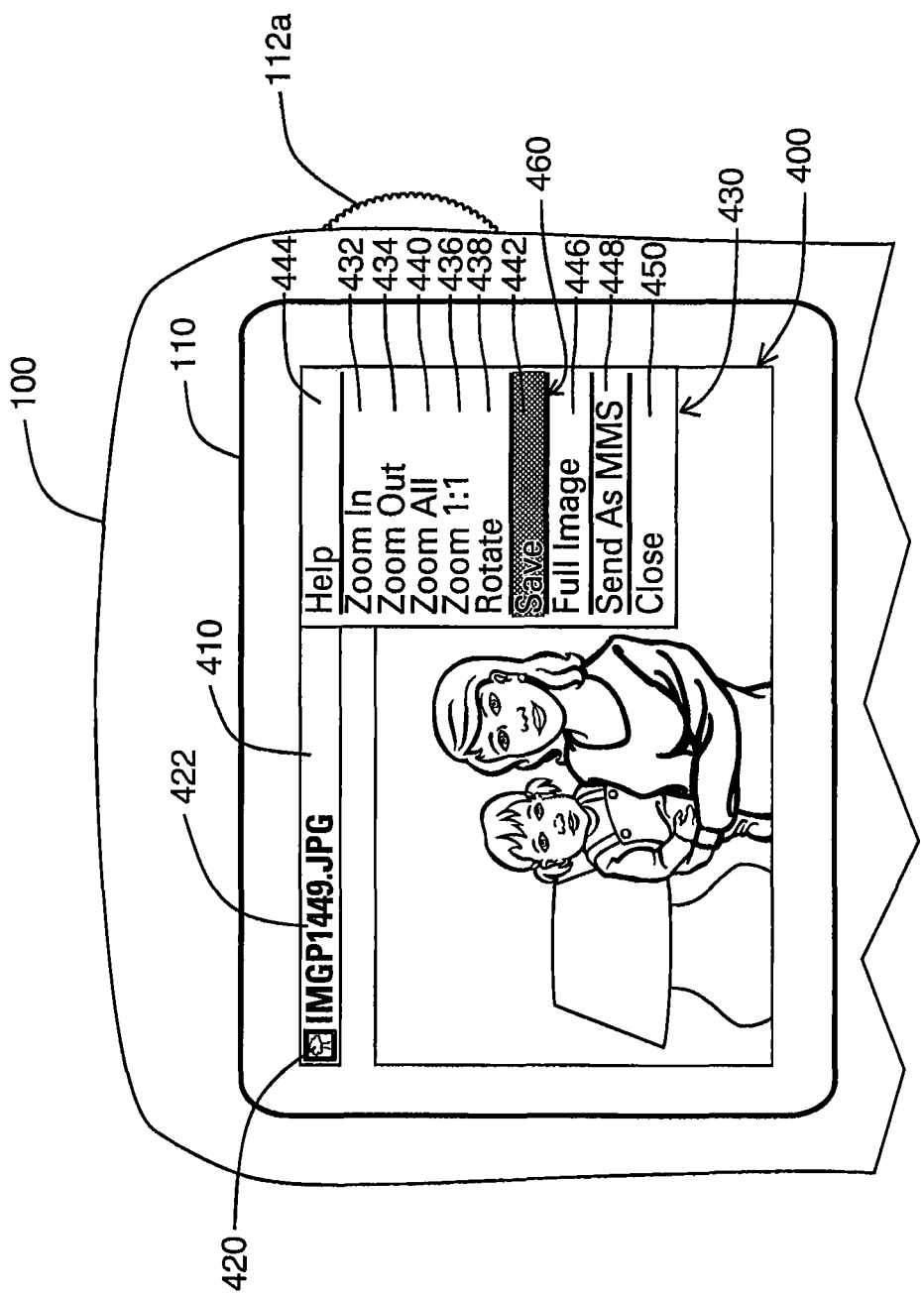

In a different example, shown in FIG. 5D, highlight bar 460 has settled on save option 442, as highlighted for selection by the user. In operation, selection of save option 442 (by the user clicking the track wheel 112a while highlight bar 460 hovers over save option 442 in menu 430) initiates saving of the image file from which image 400 is extracted to a memory store (e.g. a local picture store) on mobile device 100. In this example, once the save operation has been performed, menu 430 is no longer displayed in display 110, and the underlying image is once again shown to the user (e.g. as shown in FIG. 5A).

Referring now to FIGS. 6A to 6D, examples of screenshots of a user interface provided by a browser application executing on a mobile device in at least one embodiment are shown.

Figure 6A:
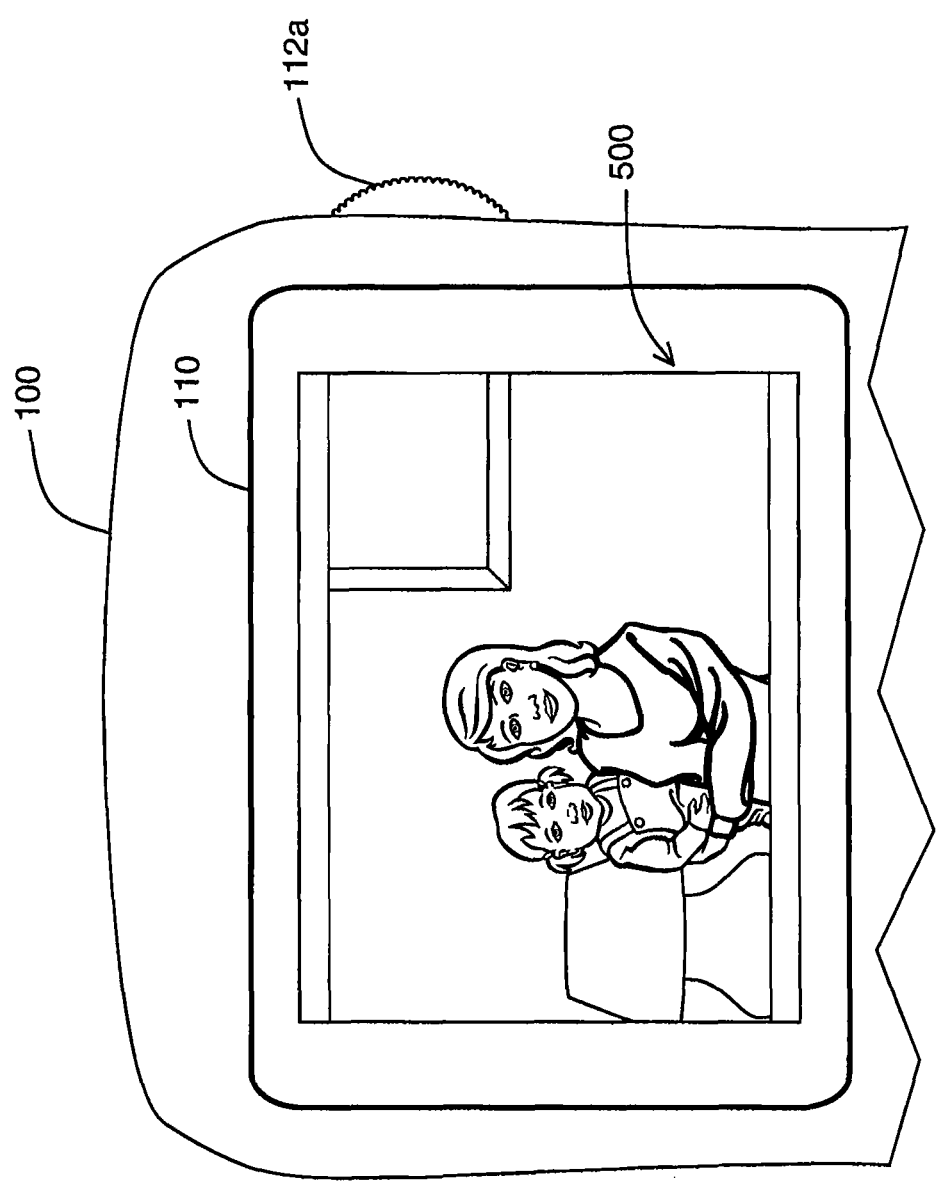
FIGS. 6A to 6D illustrate examples of screenshots of a user interface provided by a browser application executing on a mobile device in at least one embodiment.

In FIG. 6A, an image 500 displayed in a first view by the browser application in a display 110 of mobile device 100, is shown. In this example, a title bar and/or other means of providing information associated with image 500 is not shown in display 110, but may be provided in variant embodiments.

In this example, the user uses a track wheel 112a on mobile device 100 to request that a menu of options be displayed (by pressing track wheel 112a).

Figure 6B:
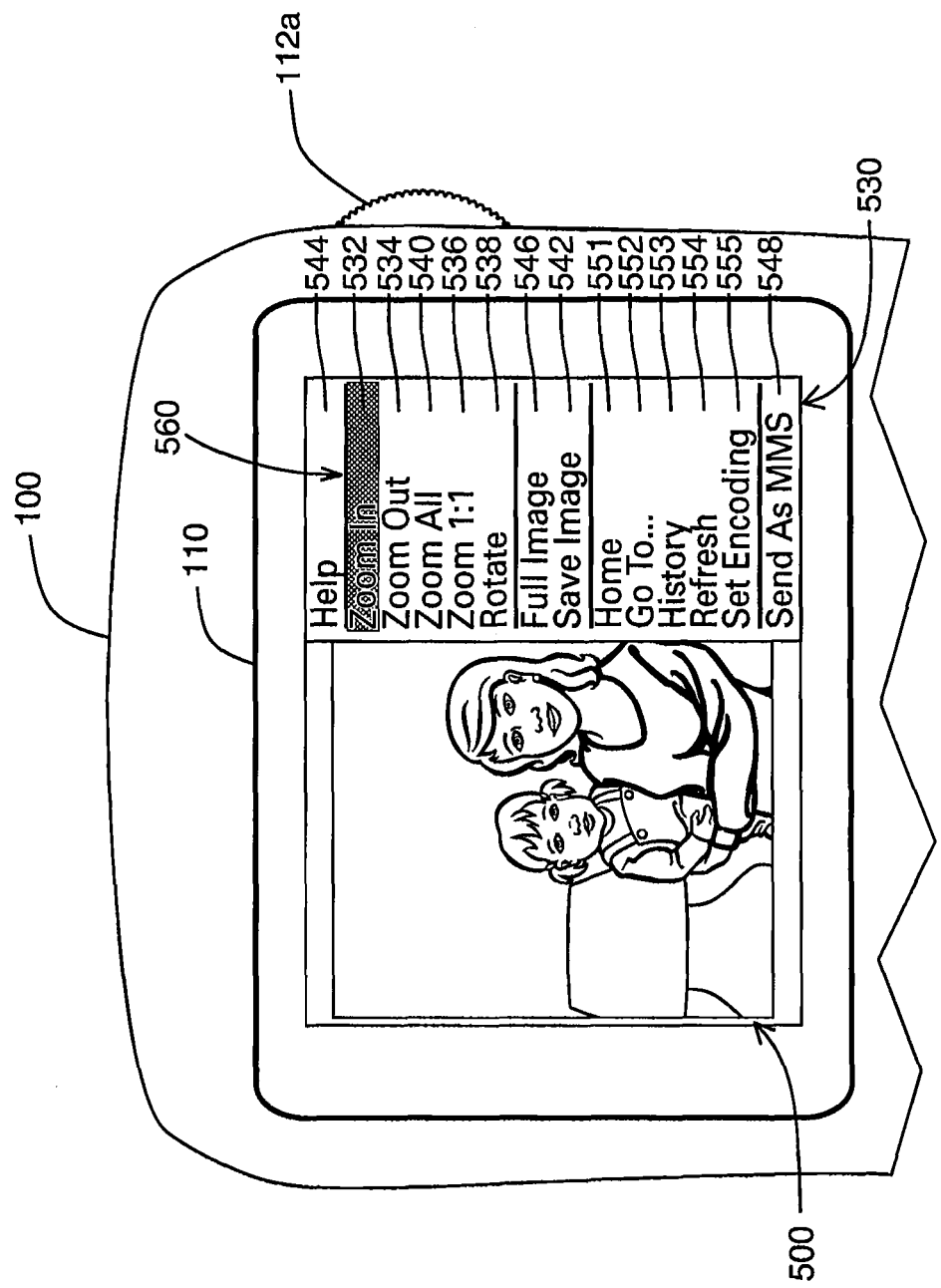

Referring to FIG. 6B, a menu of options 530 is displayed in display 110 of mobile device 100. Options in menu 530 or groups thereof may be separated by one or more line separators displayed in menu 530.

In one embodiment, the following options may be provided to a user to request operations, which when applied, may change the view of image 500 being displayed to the user:
  zoom in option (532)—magnify image by a default magnification factor;
  zoom out option (534)—reduce image by a default reduction factor;
  zoom 1:1 option (536)—display image at a scale where image is neither magnified nor reduced;
  rotate option (538)—rotate image by a default rotation factor;
  zoom all option (540)—magnify or reduce image as necessary to allow the entirety of the image to be displayed in display 110.

The foregoing options are provided by way of example only. A subset of these options, additional options, and/or different options may be provided in variant embodiments.

The options provided to a user to request operations, which when applied, may change the view of image 500 being displayed to the user, may be shown grouped together in the displayed menu of options 530 to facilitate ease of identification by the user. In one embodiment, the order in which these options are displayed may be consistent across multiple applications executable on mobile device 100.

In this example, a save option 542 is also provided to the user, allowing the user to save the image (e.g. the original image without modification) as a picture in a memory store (e.g. a local picture store) on mobile device 100.

Other options in menu 530 may also be provided to the user. By way of example only, these other options may include:
  help option (544)—request help;
  full image option (546)—request browser application to retrieve the original image in its unmodified, full-size form (as may be available from a remote server);
  send option (548)—send the image as a (e.g. Multimedia Message Service (MMS)) message;
  close option (not shown)—close the menu of options and return to viewing image;
  browser options (551-555)—perform a browser operation, such as display a home page (551), go to a specified page (552), display a history of visited pages (553), refresh the browser image (554), set a default encoding (555).

Where all available options cannot be displayed in the portion of menu 530 being displayed in display 110, the user may scroll through menu 530 to cause other options to be displayed, using track wheel 112a. An arrow or other icon (not shown) indicating that additional options are available but not currently shown may be displayed in menu 530.

In the example of FIG. 6B, a highlight bar 560 is shown in display 110 within menu 530. By rotating track wheel 112a, highlight bar 560 may be repositioned to highlight different menu options in menu 530. Once the user identifies a specific menu option, by manipulating track wheel 112a so that highlight bar 560 settles on that specific option, the user may, for example, click track wheel 112a to select the highlighted option. In this example, highlight bar 560 is shown as highlighting zoom in option 532.

Figure 6C:
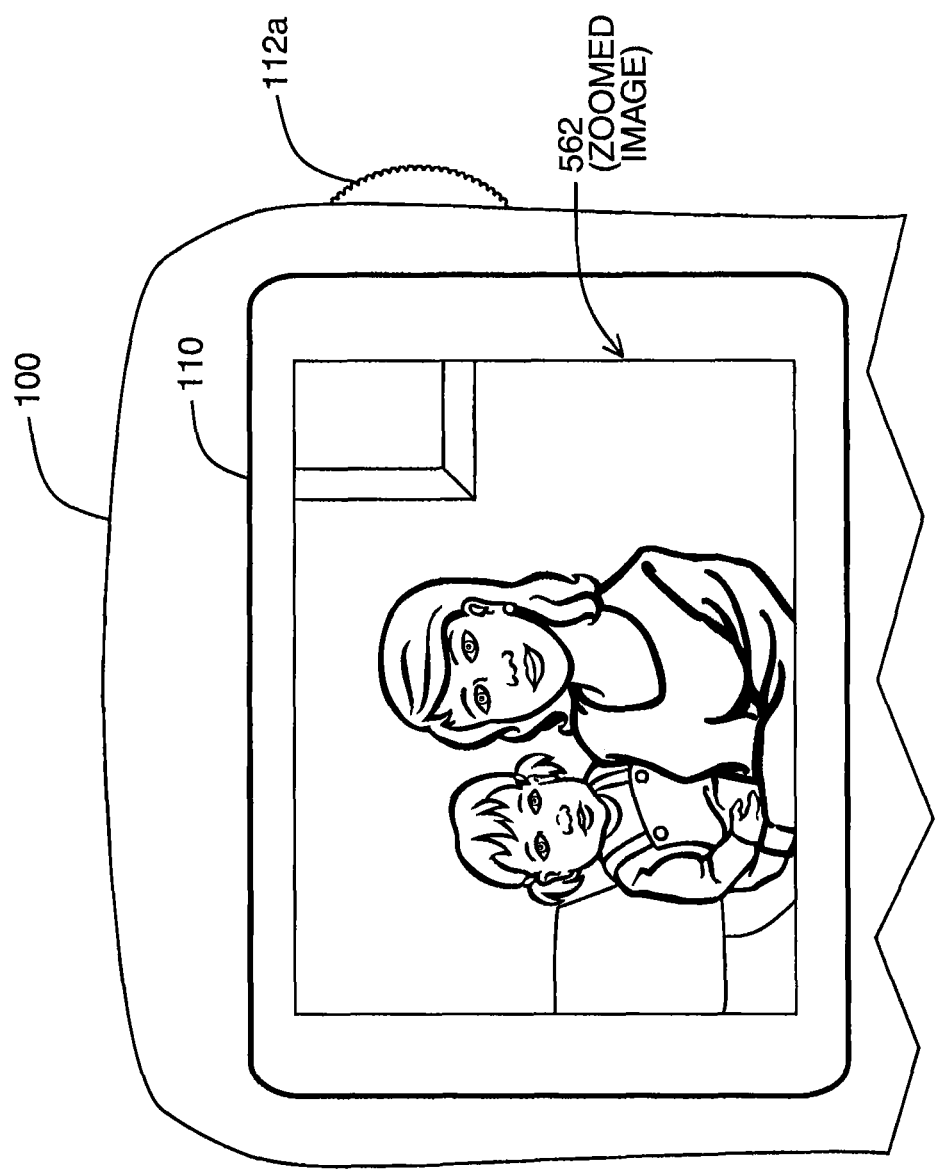

Referring to FIG. 6C, in this example, the user has selected zoom in option 532 of FIG. 6B by clicking track wheel 112a. The operation associated with the selected option is applied, causing image 500 to be magnified. The resultant magnified ("zoomed in") image in a second view 562 is shown in display 110. As is shown in FIG. 6C, once the zoom operation has been performed, menu 530 is no longer displayed in display 110.

Figure 6D:
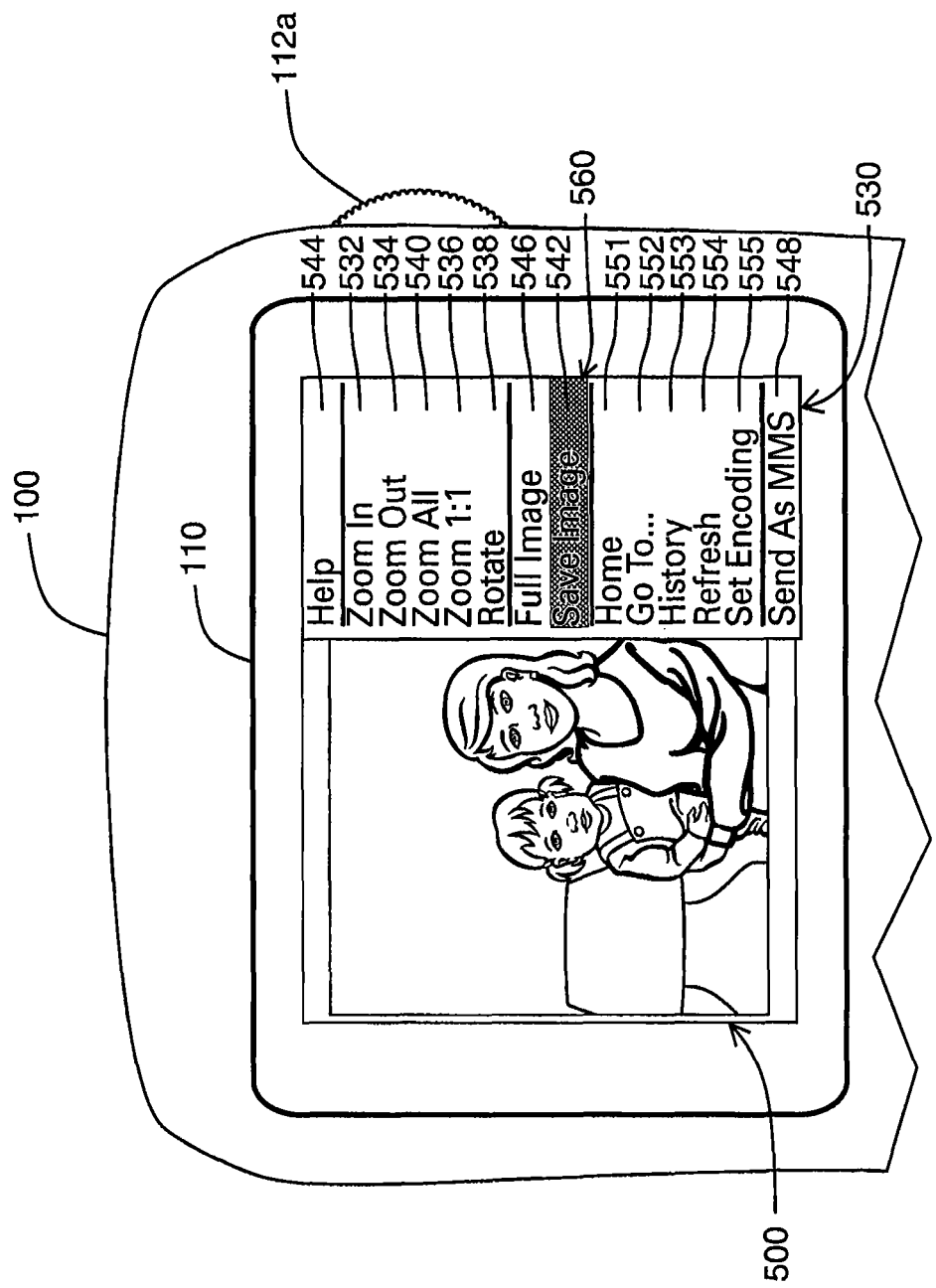

In a different example, shown in FIG. 6D, highlight bar 560 has settled on save (image) option 542, as highlighted for selection by the user. In operation, selection of save option 542 (by the user clicking the track wheel 112a while highlight bar 560 hovers over save option 542 in menu 530) initiates saving of the image file from which image 500 is extracted to a memory store (e.g. a local picture store) on mobile device 100. In this example, once the save operation has been performed, menu 530 is no longer displayed in display 110, and the underlying image is once again shown to the user (e.g. as shown in FIG. 6A).

Referring now to FIGS. 7A to 7D, examples of screenshots of a user interface provided by a picture viewer application executing on a mobile device in at least one embodiment are shown.

Figure 7A:
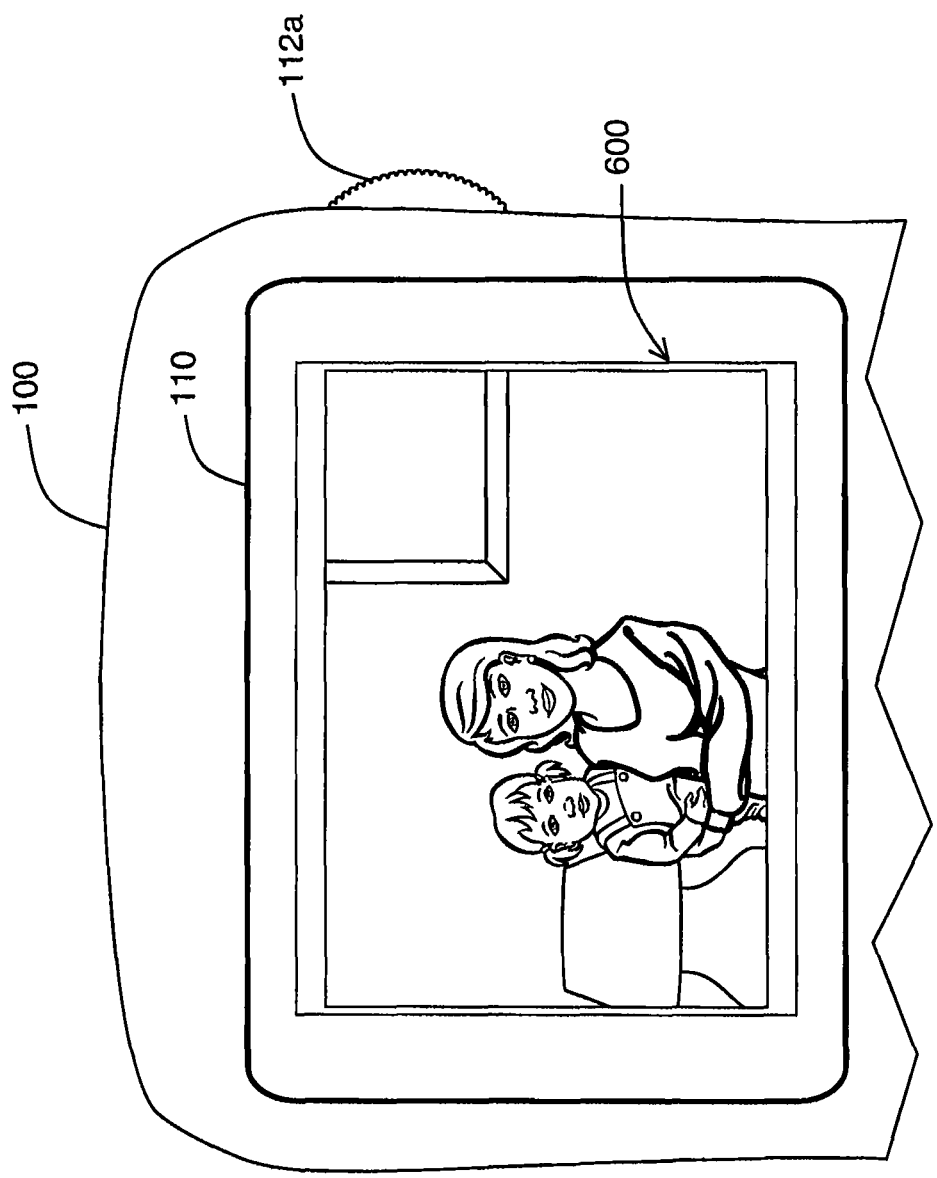

In FIG. 7A, an image 600 displayed in a first view by the picture viewer application in a display 110 of mobile device 100, is shown. In this example, a title bar and/or other means of providing information associated with image 600 is not shown in display 110, but may be provided in variant embodiments.

In this example, the user uses a track wheel 112a on mobile device 100 to request that a menu of options be displayed (by pressing track wheel 112a).

Figure 7B:
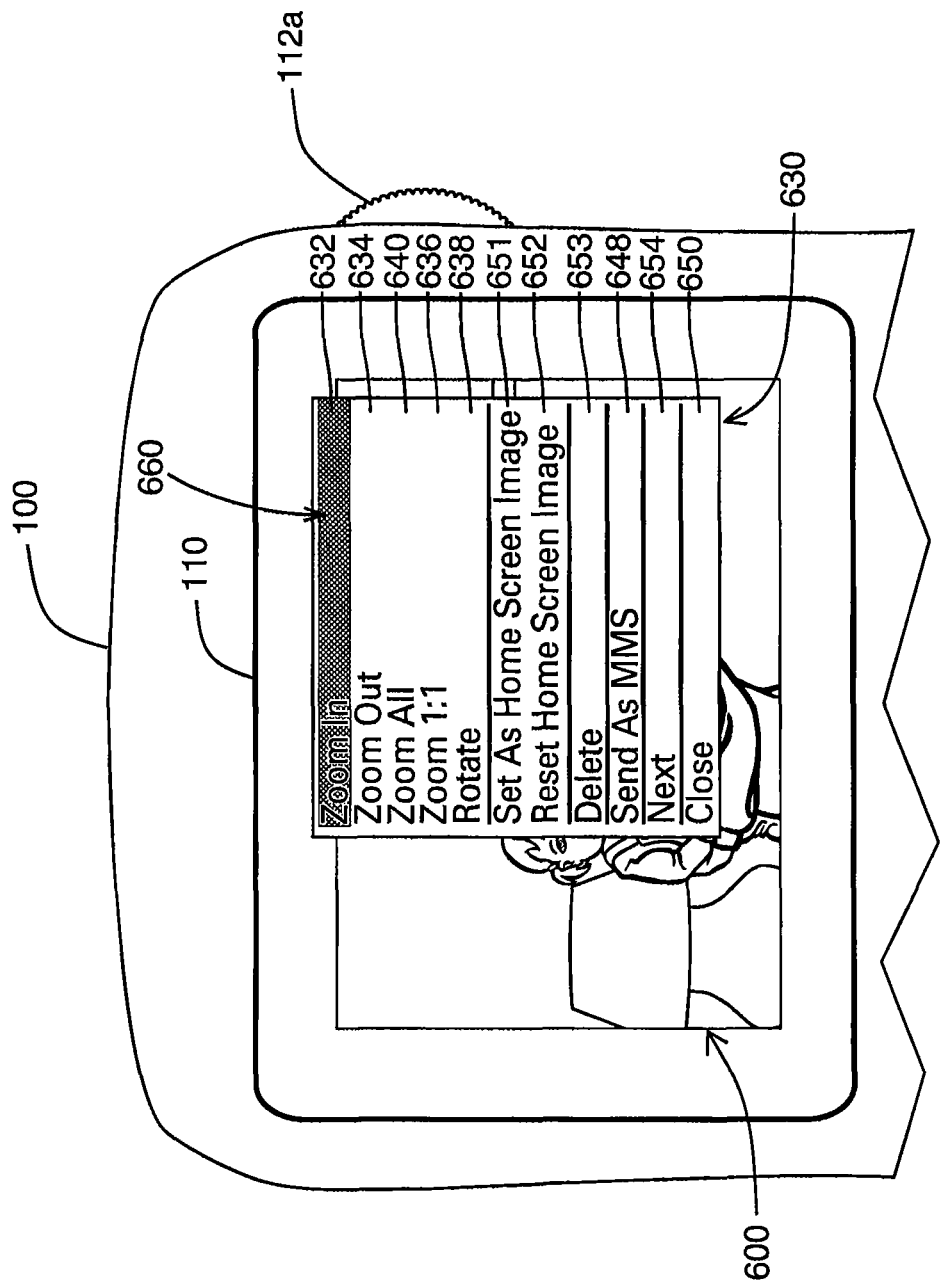

Referring to FIG. 7B, a menu of options 630 is displayed in display 110 of mobile device 100. Options in menu 630 or groups thereof may be separated by one or more line separators displayed in menu 630.

In one embodiment, the following options may be provided to a user to request operations, which when applied, may change the view of image 600 being displayed to the user:
  zoom in option (632)—magnify image by a default magnification factor;
  zoom out option (634)—reduce image by a default reduction factor;
  zoom 1:1 option (636)—display image at a scale where image is neither magnified nor reduced;
  rotate option (638)—rotate image by a default rotation factor;
  zoom all option (640)—magnify or reduce image as necessary to allow the entirety of the image to be displayed in display 110.

The foregoing options are provided by way of example only. A subset of these options, additional options, and/or different options may be provided in variant embodiments.

The options provided to a user to request operations, which when applied, may change the view of image 600 being displayed to the user, may be shown grouped together in the displayed menu of options 630 to facilitate ease of identification by the user. In one embodiment, the order in which these options are displayed may be consistent across multiple applications executable on mobile device 100.

In a variant embodiment, a save option (not shown) may also be provided to the user, allowing the user to edit an image and save the edited image as a picture in a memory store (e.g. a local picture store) on mobile device 100.

Other options in menu 630 may also be provided to the user. By way of example only, these other options may include:
- help option (not shown)—request help;
- send option (648)—send the image as a (e.g. Multimedia Message Service (MMS)) message;
- close option (650)—close the menu of options and return to viewing image;
- set as home screen image (651)—set the image as the background image for the home screen;
- reset home screen image (652)—reset the background image for the home screen to a previous image;
- set as standby screen (not shown)—set the image as the background image for the standby screen;
- reset standby screen (not shown)—reset the background image for the standby screen to a previous image.

Where all available options cannot be displayed in the portion of menu 630 being displayed in display 110, the user may scroll through menu 630 to cause other options to be displayed, using track wheel 112*a*. An arrow or other icon (not shown) indicating that additional options are available but not currently shown may be displayed in menu 630.

In the example of FIG. 7B, a highlight bar 660 is shown in display 110 within menu 630. By rotating track wheel 112*a*, highlight bar 660 may be repositioned to highlight different menu options in menu 630. Once the user identifies a specific menu option, by manipulating track wheel 112*a* so that highlight bar 660 settles on that specific option, the user may, for example, click track wheel 112*a* to select the highlighted option. In this example, highlight bar 660 is shown as highlighting zoom in option 632.

Referring to FIG. 7C, in this example, the user has selected zoom in option 632 of FIG. 7B by clicking track wheel 112*a*. The operation associated with the selected option is applied, causing image 600 to be magnified. The resultant magnified ("zoomed in") image in a second view 662 is shown in display 110. As is shown in FIG. 7C, once the zoom operation has been performed, menu 630 is no longer displayed in display 110.

Figure 7D:
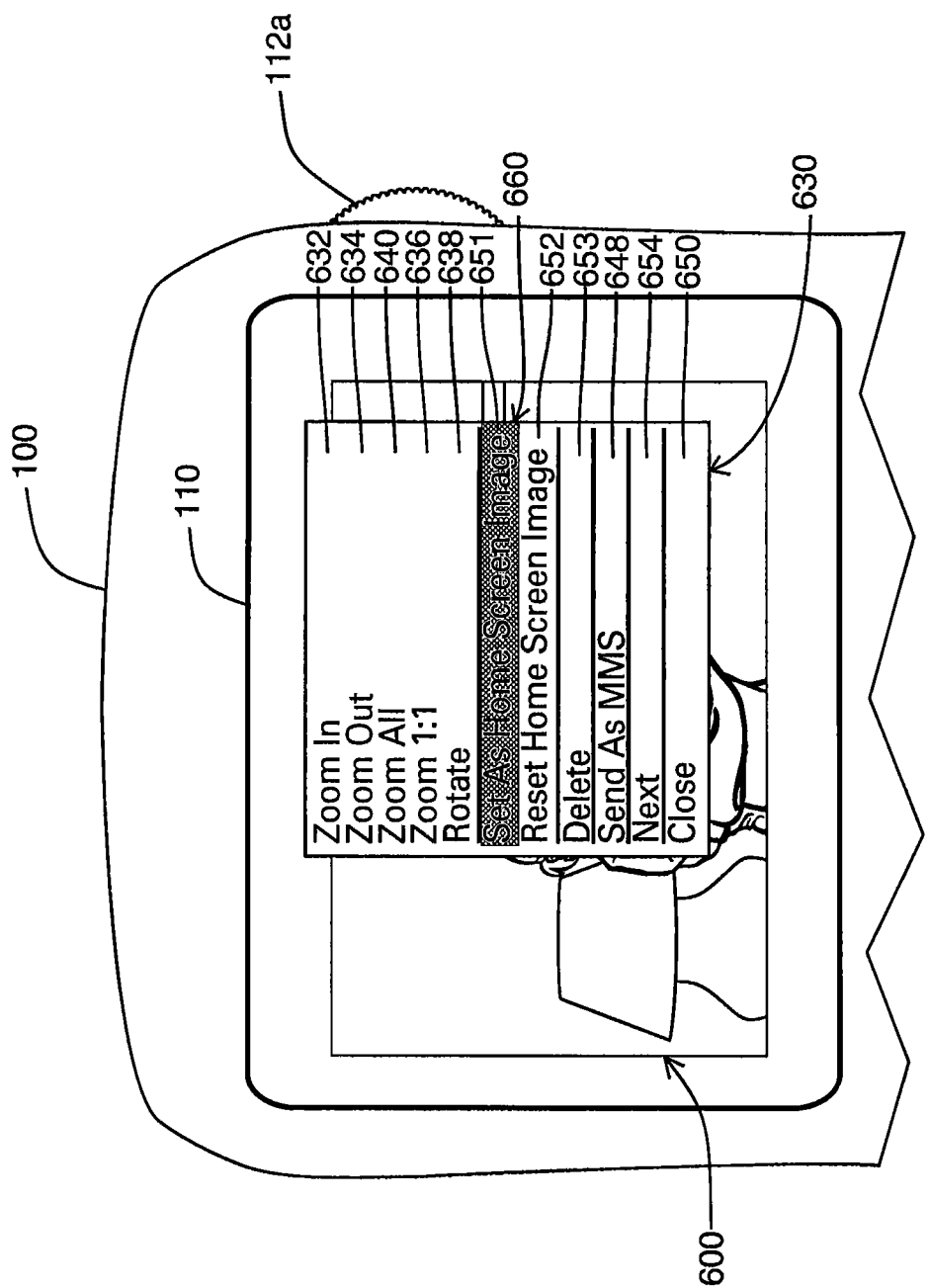

In a different example, shown in FIG. 7D, highlight bar 660 has settled on set as home screen image option 661, as highlighted for selection by the user. In operation, selection of this option (by the user clicking the track wheel 112*a* while highlight bar 660 hovers over set as home screen image option 661 in menu 630) initiates the setting of the image as a background image on the home screen. The set image may be the image at a normal scale (e.g. without magnification, reduction, or other changes), or with applied changes (e.g. as may then be currently shown in display 110). In this example, once the set operation has been performed, menu 630 is no longer displayed in display 110, and the underlying image is once again shown to the user (e.g. as shown in FIG. 7A).

As noted above in this description, in at least one embodiment, at least some of the options displayed in a menu (e.g. 430, 530, 630) will be provided to the user that are common across multiple applications. For example, the following options may be provided to the user in each of an attachment viewer, a browser and a picture viewer application:
- zoom in
- zoom out
- zoom 1:1
- zoom all
- rotate.

The above set of options is provided by way of example only, and other combinations of options are possible in variant embodiments. Options associated with operations that, when performed, would result in a change being applied to the view of an image being displayed, may be displayed in menus in the same order, in each of the multiple applications.

As previously noted, although there are certain advantages when features of the embodiments described herein are implemented in respect of mobile devices, it will be understood by persons skilled in the art that the features may also be implemented in respect of other computing devices.

The steps of a method of controlling the display of images on a mobile device in embodiments described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A mobile device comprising:
   a processor;
   a memory;
   a display screen; and
   a plurality of software applications executable by the processor, wherein the plurality of software applications comprises an image viewer application and an attachment viewer application for viewing an attachment to a message that is received by the mobile device and wherein the processor is configured to:
   while an image provided by the image viewer application is displayed on the display screen, display a first plurality of menu items on the display screen, the first plurality of menu items representing image manipulation options for manipulating a view of the image provided by the image viewer application; and
   while an image provided by the attachment viewer application is displayed on the display screen, display a second plurality of menu items on the display screen, the second plurality of menu items being visually similar to the first plurality of menu items, the second plurality of menu items representing image manipulation options for manipulating a view of the image provided by the attachment viewer application.

2. The mobile device of claim 1, wherein the processor is configured to display the first plurality of menu items in a menu provided by the image viewer application.

3. The mobile device of claim 1, wherein the processor is configured to display the second plurality of menu items in a menu provided by the attachment viewer application.

4. The mobile device of claim 1, wherein the processor is configured to save the image provided by the image viewer application to memory.

5. The mobile device of claim 4, wherein the processor is configured to save the view of the image provided by the image viewer application to memory.

6. The mobile device of claim 1, wherein the processor is configured to receive input comprising a selection of a menu item selected from the first plurality of menu items, and manipulate the view of the image provided by the image viewer application to produce a manipulated view of the image.

7. The mobile device of claim 6, wherein the processor is configured to save the manipulated view of the image to memory.

8. The mobile device of claim 1, wherein the processor is configured to receive input comprising a selection of a menu item selected from the second plurality of menu items, and manipulate the view of the image provided by the attachment viewer application to produce a manipulated view of the image.

9. The mobile device of claim 8, wherein the processor is configured to save the manipulated view of the image to memory.

10. The mobile device of claim 1, wherein the first plurality of menu items comprises at least one menu item representing image manipulation options selected from the following group: zoom in, zoom out, zoom all, zoom 1:1, and rotate.

11. A method of controlling the display of images on a mobile device, the method comprising:
    displaying on a display screen of the mobile device an image provided by an image viewer application;
    displaying on the display screen a first plurality of menu items representing image manipulation options for manipulating a view of the image provided by the image viewer application;
    displaying on the display screen an image provided by an attachment viewer application for viewing an attachment to a message that is received by the mobile device;
    displaying on the display screen a second plurality of menu items visually similar to the first plurality of menu items, the second plurality of menu items representing image manipulation options for manipulating a view of the image provided by the attachment viewer application; and
    wherein a processor on the mobile device is configured to perform the method.

12. A non-transitory computer-readable medium storing a plurality of processor-executable instructions for performing a method of controlling the display of images on a mobile device, the method comprising:
    displaying on a display screen of the mobile device an image provided by an image viewer application;
    displaying on the display screen a first plurality of menu items representing image manipulation options for manipulating a view of the image provided by the image viewer application;
    displaying on the display screen an image provided by an attachment viewer application for viewing an attachment to a message that is received by the mobile device; and
    displaying on the display screen a second plurality of menu items visually similar to the first plurality of menu items, the second plurality of menu items representing image manipulation options for manipulating a view of the image provided by the attachment viewer application.

13. The medium of claim 12, wherein the method further comprises the image provided by the image viewer application to memory.

14. The medium of claim 12, wherein the method further comprises receiving input comprising a selection of a menu item selected from the first plurality of menu items, and manipulating the view of the image provided by the image viewer application to produce a manipulated view of the image.

15. The medium of claim 12, wherein the method further comprises receiving input comprising a selection of a menu item selected from the second plurality of menu items, and manipulating the view of the image provided by the attachment viewer application to produce a manipulated view of the image.

16. The medium of claim 12, wherein the first plurality of menu items comprises at least one menu item representing image manipulation options selected from the following group: zoom in, zoom out, zoom all, zoom 1:1, and rotate.

* * * * *